United States Patent [19]

Weaver

[11] E Patent Number: Re. 32,117

[45] Reissued Date of Patent: Apr. 22, 1986

[54] FORGING PROCESS

[75] Inventor: Elbert K. Weaver, Westboro, Mass.

[73] Assignee: Wyman-Gordon Company, Grafton, Mass.

[21] Appl. No.: 321,379

[22] Filed: Nov. 16, 1981

Related U.S. Patent Documents

Reissue of:

[64] Patent No.: 4,094,053
Issued: Jun. 13, 1978
Appl. No.: 688,620
Filed: May 21, 1976

U.S. Applications:

[63] Continuation of Ser. No. 98,627, Nov. 29, 1979, abandoned.

[51] Int. Cl.[4] ..... B23P 17/00; B22F 3/24

[52] U.S. Cl. ..... 29/423; 264/56; 264/317; 264/313; 419/53; 419/42; 419/28; 419/38; 425/405 H; 419/68; 29/421 R

[58] Field of Search ..... 75/214, 224, 225, 226, 75/200; 425/405 H; 29/420.5, 420, 423, 421 R; 419/50, 43, 53, 34, 32, 67, 69, 42, 28, 38, 68; 264/56, 67, 221, 317, 313

[56] References Cited

U.S. PATENT DOCUMENTS

| | | | |
|---|---|---|---|
| 126,470 | 5/1917 | Coolidge . | |
| 2,783,504 | 3/1957 | Hamjian et al. . | |
| 2,847,708 | 8/1958 | Hamjian et al. . | |
| 3,051,567 | 8/1962 | Ziegler . | |
| 3,158,474 | 11/1964 | Anderson et al. . | |
| 3,269,826 | 8/1966 | Bumgarner | 264/84 |
| 3,340,053 | 9/1967 | Hodge et al. . | |
| 3,383,208 | 5/1968 | Corral . | |
| 3,499,066 | 3/1970 | Murray | 264/313 |
| 3,502,755 | 3/1970 | Murray | 264/313 |
| 3,656,946 | 4/1972 | Inque et al. . | |
| 3,741,755 | 6/1973 | Allen | 29/423 |
| 3,753,704 | 8/1973 | Manilla et al. . | |
| 3,841,870 | 10/1974 | Hamjian . | |
| 3,889,350 | 6/1975 | Mocarski . | |
| 3,932,178 | 1/1976 | Larsson et al. . | |
| 3,982,934 | 9/1976 | Wentzell . | |
| 3,989,518 | 11/1976 | Rueckl . | |
| 4,023,966 | 5/1977 | Loersch et al. . | |
| 4,065,303 | 12/1977 | Sielstorfer et al. . | |
| 4,069,042 | 1/1978 | Buchovecky et al. . | |

*Primary Examiner*—Howard N. Goldberg
*Assistant Examiner*—Vernon K. Rising
*Attorney, Agent, or Firm*—Blodgett & Blodgett

[57] ABSTRACT

Process for manufacturing a forged article in which a preform is generated by filling a semi-rigid liner with powdered metal, providing the liner with a sealing element, and isostactically compressing the liner and its contents. The liner is then removed from the green preform, the preform is sintered, and the resulting sintered preform is forged.

6 Claims, 9 Drawing Figures

FORGING PROCESS

Matter enclosed in heavy brackets [ ] appears in the original patent but forms no part of this reissue specification; matter printed in italics indicates the additions made by reissue.

*This is a continuation of application Ser. No. 98,627 filed Nov. 29, 1979, now abandoned, which is a reissue of U.S. Pat. No. 4,094,053.*

BACKGROUND OF THE INVENTION

Forging is a process by which the shape and physical properties of metal can be changed. The process involves placing the piece of metal (normally heated) between the halves of a die and forcing the die to close by impact or pressure. The operation causes a controlled plastic deformation of the metal into the cavities of the die. This flow of material results not only in a change in the shape of the metal, but also improves the uniformity of the metal, improves its grain structure, and causes a shape-conforming grain flow. The resulting workpiece has properties which are superior to those generated by other methods, thus making forging essential where high performance workpieces are required.

One of the difficulties in the forging process is that, when a complex shape is to be manufactured, the workpiece which is fed to the final forging die must be relatively close to the final desired shape. This workpiece (which is shaped properly to be placed in the final forging process) is called a "preform." The design and formation of this perform can be critical to the economics of the forging process, since these factors affect the useful life of the final forging dies and the power requirements of the press and the amount of waste of metal in the flash.

In the past, two general procedures were used to develop the preforms. Where maximum performance of the workpieces is required, a series of forging operations can be used. The standard mill stock may be exposed to several roller impressions, some bending and twisting impressions, gathering and conditioning impressions, and then blocking impressions. Each of these operations requires substantial expenditures for specialized forming equipment and the cost of the operations can only be justified in extreme situations. In workpieces in which the strength requirements are not as rigorous, the preform can be machined from the mill stock using standard cutting methods. This process can involve a great deal of wasted material and, its practicality is severely effected by the spiraling increase in the cost of the various resources necessary to carry it out.

It has been suggested that the shortcomings of the above processes could be eliminated in certain situations by the formation of forging preforms from powdered metal. When a powdered metal is forged, its porosity is substantially reduced and its mechanical properties may be improved, so that they are equal or close to those obtained in forged conventional metal. While the arguments in favor of such a process make a great deal of sense, the practical problems of carrying out an economic system (particularly where large or complex shapes are involved) have not been satisfactorily solved. If powder metallurgical preforms are made in "hard" tooling, the presence of multi-level portions in the pressing direction, the presence of side wall friction, and the presence of tall parts all pose severe problems for their manufacture. When the preform is made with "soft" tooling, as used in isopressing, the need for time-consuming bag filling, supporting, bag stripping, and pressurizing and de-pressurizing cycles tend to reduce production rates to unacceptably low levels. These and other difficulties experienced with the prior art processes have been obviated in a novel manner by the present invention.

It is, therefore, an outstanding object of the present invention to provide an efficient and economically advantageous process for forming forged articles.

Another object of this invention is the provision of a process in which the preforms of the forging process are generated from powdered metal.

A further object of the present invention is the provision of a forging process in which the preforms are formed by casting powdered metal in semi-rigid molds, isostatically compacting the mold and its contents, removing the mold from the compacted contents, and sintering the green contents to generate the preform.

It is another object of the instant invention to provide a forging process in which a powdered metal preform is developed in a method which can be adapted to automation, because the steps involve relatively simple mechanical operations which can be carried out in a manner consistent with modern manufacturing techniques.

A still further object of the invention is the provision of a forging process which results in forged articles which have mechanical properties equal or close to articles manufactured by conventional methods.

With these and other objects in view, as will be apparent to those skilled in the art, the invention resides in the combination of steps set forth in the specification and covered by claims appended hereto.

SUMMARY OF THE INVENTION

This invention involves a process for manufacturing forged articles from powdered metal preforms. The process involves preparing a semi-rigid liner of a shape suitable for a forging preform, filling the liner with powdered metal, providing it with a sealing element, and then isostatically compressing the liner and its contents. After that, the process involves removing the liner from the green preform, sintering the preform, and then forging it. After compaction, the liner is removed from the contents either before or after a softening heat step by decomposing the liner in the sintering furnace.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
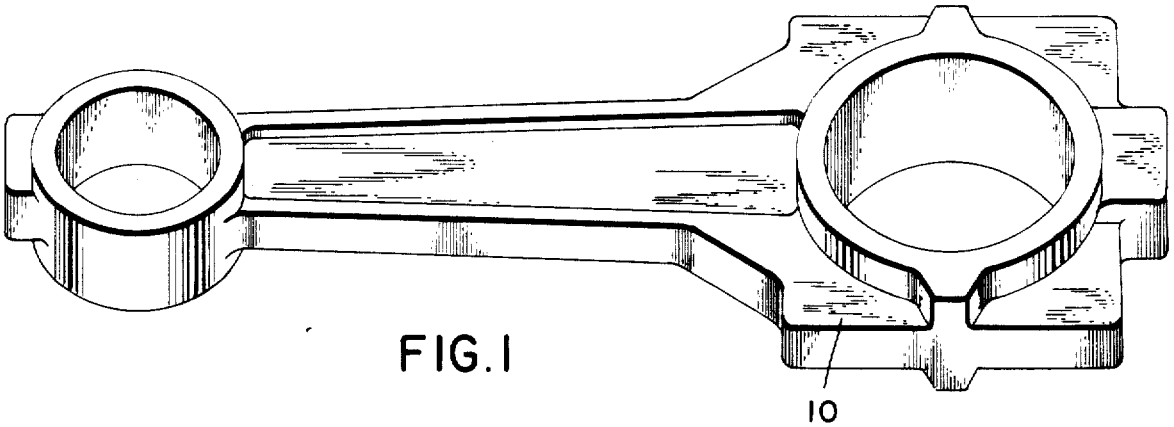
FIG. 1 is a perspective view of a forged article manufactured by a process embodying the principles of the present invention.

FIG. 1 shows a workpiece 10 which has characteristics making it particularly suitable for manufacture by the present forging process. The article is shown as a connecting rod for an internal combustion engine and, therefore, for well-known reasons, it must have the strength-to-weight and strength-to-volume ratios which are now achieved by a forging process. The shape of the connecting rod is sufficiently irregular that the preparation of a suitable preform for finish forging would require several complex, expensive, and wasteful operations as it is made by using conventional prior art methods. A suitable preform from which to forge this article is relatively large (approximately 20 inches long) and, as a result, is particularly unsuited to be made by prior art powdered metal techniques. This is not only because it is too large to be processed practically in standard "hard", powdered metal tools, but also the unsintered preform would have to have substantial strength in order to be handled without fracturing. It should be noted that, while the present process is particularly suited for this type of workpiece, it is also useful in forming less challenging articles.

Figure 3:
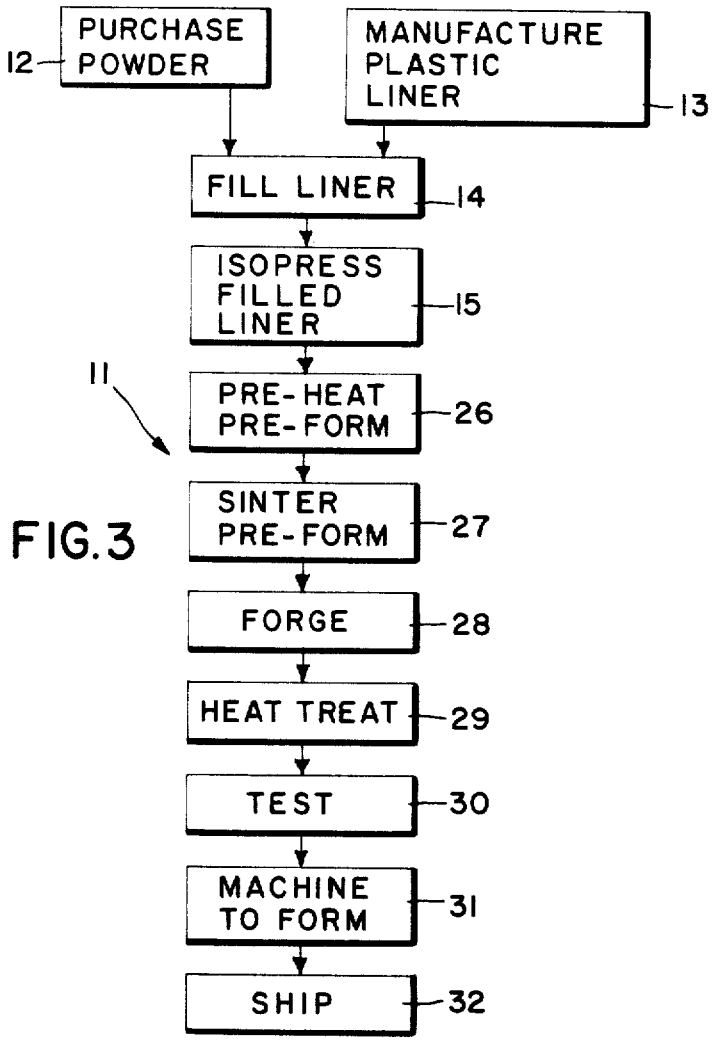
FIG. 3 is a flow chart showing the generalized steps of the present process.

Referring now to FIG. 3, which shows a general scheme of steps making up the forging process of the present invention, the process, indicated generally by the numeral 11, begins with the purchase of powder in Step 12 and the manufacture of plastic liners or container in Step 13. The powdered metal is of the type well-known in the powdered metal forming art, and in the preferred embodiment is of the atomized alloy-steel powdered metal designated as modified 46XX 46XX or 46FXX 46FXX compositions. Although the details of the manufacturing process for the plastic liners will be described in detail below, the function is to produce a thin-walled, inexpensive, disposable liner formed of a material such as expanded polystyrene and having an internal cavity of a precisely desired shape. The desired shape will be a shape determined by reverse engineering, backward through the remaining steps in the process. The characteristics of the liner are that it be made of an inexpensive material, that it be capable of collapsing against the powder under the influence of the external isostatic pressure, without severe angular distortion. Some means may be provided to cause the liner to maintain its precise internal shape while being filled with the powder. Such factors will be discussed in further detail hereinafter.

In Step 14, the liner is filled with the metal powder. It has also been found that vibrating or rotating the liner during or after the filling Step 14 provides a more uniform and, therefore, more predictable powder mass.

Figure 2:
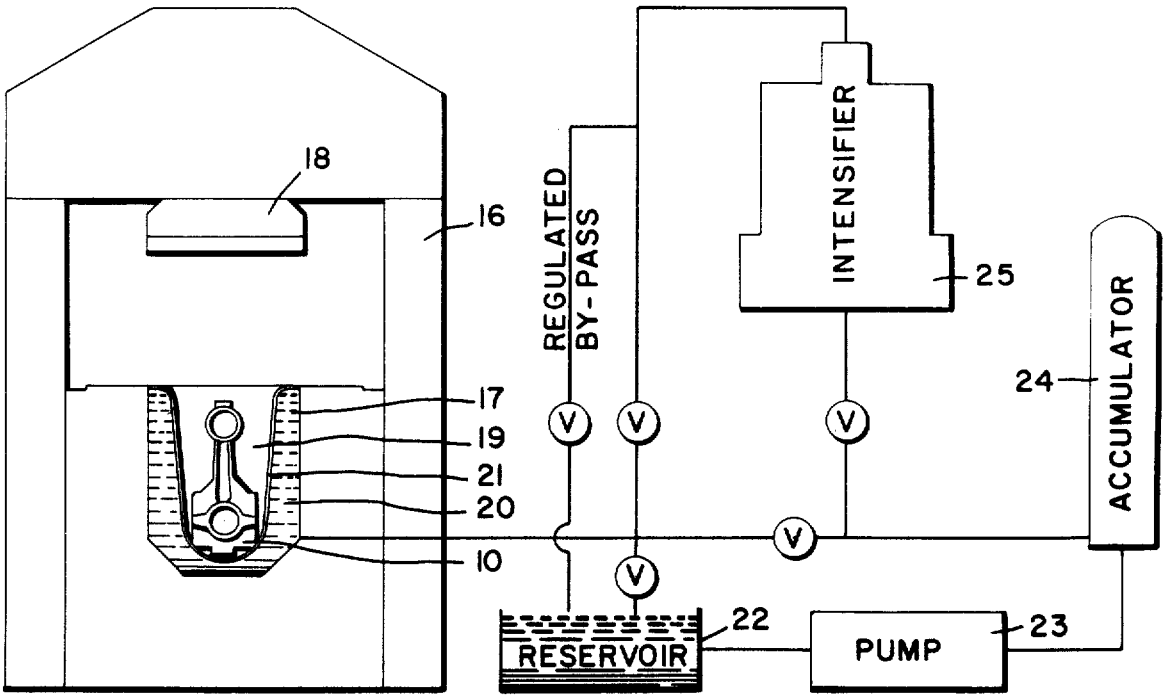
FIG. 2 is a diagrammatic representation of the isostatic compaction equipment that might be utilized in the process of the present invention.

In Step 15, the liner and its contents are isopressed, that is, exposed to isostatic pressure. While this isopressing can be accomplished by a number of methods, in the preferred embodiment of this invention, it is carried out by the so-called dry-bag method as shown in FIG. 2. In this method, the isopress 16 has a cavity 17 which is closable by a pressure cap 18. The cavity 17 is divided into an inner chamber 19 and an outer chamber 20 by a flexible rubber bag 21. The workpiece 10, consisting of the plastic liner filled with metal powder, is placed in the inner chamber 19 and the cavity 17 is sealed by cap 18. The outer chamber 20 is then filled with high-pressure fluid which causes the rubber bag 21 and liner to collapse against the contents of the liner, and exerts an isostatic, omni-directional pressure on all surfaces of the workpiece 10. This isostatic pressure causes a compaction, consolidation, and strengthening of the now "green" workpiece 10. The high pressure fluid is provided by a system including a reservoir 22, a pump 23, and an accumulator 24, and an intensifier 25. The elements are piped together so that the pump feeds through the accumulator to an intensifier loop and thence into the outer chamber 20. Valves are provided to control the supply of pressure and to release the pressure from the outer chamber 20 at the end of the isopressing cycle. At the end of the isopressing cycle, the pressure is released from the outer chamber 20. As a result, the rubber bag 21 returns to its original condition because the liner prevents the rubber bag from interlocking with the powder during the pressing. However, the plastic liner will normally set to the new, compacted shape of its contents. This relationship of the various flexible elements in the system minimizes the stresses imposed on the "green" workpiece and helps to prevent breakage.

After the workpiece 10 or preform has been removed from the isopress 16, it may be exposed to a preheat Step 26 which prepares it for sintering. This preheat step would be of the type normally used to prepare powdered metal "green" workpieces for sintering. Preheating may be used to soften the liner for removal or it may be used to decompose the liner.

Next the sintering Step 27 is carried out on the workpiece. The preform is then forged in Step 28, heat-treated in Step 29, tested in Step 30, machined, if necessary, to final form in Step 31, and then shipped in Step 32. The result of this process 11 is a workpiece which possesses the desirable characteristics of a conventionally-forged article and, yet, avoids the substantial expense and wastage of forming a billet from the molten metal and then shaping it into the required preform.

Two areas of the process require further discussions; the techniques used to form and fill the liners, and the technique used to remove the liner from the isopressed preform.

Figure 6:
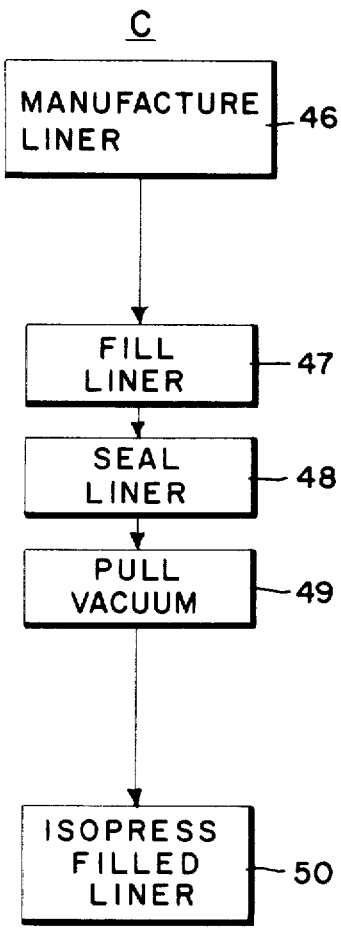
FIG. 6 shows the detailed steps of another version of the present process.

In the preferred embodiment, the liner would be formed and filled using technique C shown figuratively in FIG. 6. Likewise, in the preferred embodiment, the liner would be removed using technique Z shown in FIG. 9.

Referring now to FIG. 6, Step 46 involves the manufacture of the liner. Step 46 would normally be carried out at a remote location and interface only batch-wise with the remainder of the process. The manufacture could involve numerous well-known methods for generating a thin-walled, hollow liner of polymeric material. In Step 47 the liner is filled with the powdered metal as previously discussed. The liner and its contents are placed in the flexible bag 21 of the isopress 16 in Step 50 and isopressed in the normal way.

Figure 4:
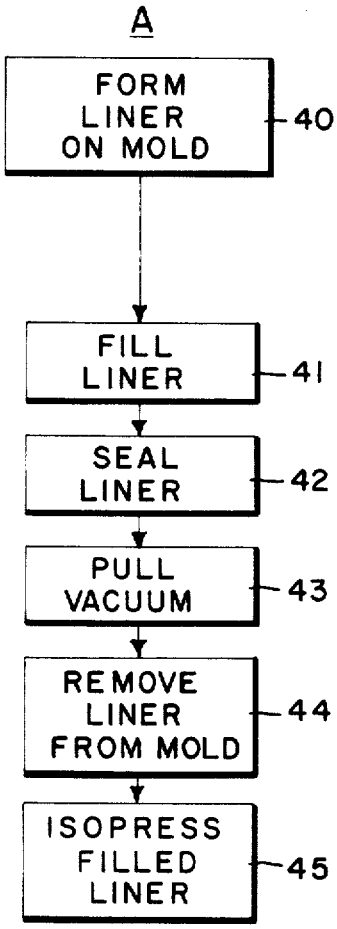
FIG. 4 shows the detailed steps of one version of the present process.

An alternative technique A shown in FIG. 4 is similar to technique B except that the negative mold which is used to form the liner is also used as a liner support during filling. Thus, in Step 40 the polymeric material of the liner would be placed on the negative side of a mold of the desired shape, by a suitable coating process.

The liner would then be filled with the metal powder without removing the liner from its mold in Step 41. Finally, the liner and its contents would be isopressed in the normal way in Step 45. This technique can be particularly useful for large sized parts where the liner support may be necessary to maintain the loose powder in shape before and during pressing.

Figure 5:
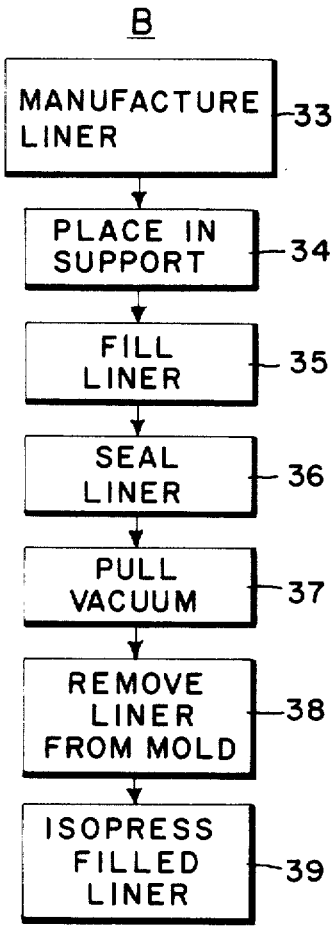
FIG. 5 shows the detailed steps of another version of the present process.

Technique B shown in FIG. 5, is similar to technique C except that in technique B the liner is so pliable that it must be supported during filling and handling or it will suffer significant deterioration of its shape. Filling is accomplished while the liner is being supported.

Figure 9:
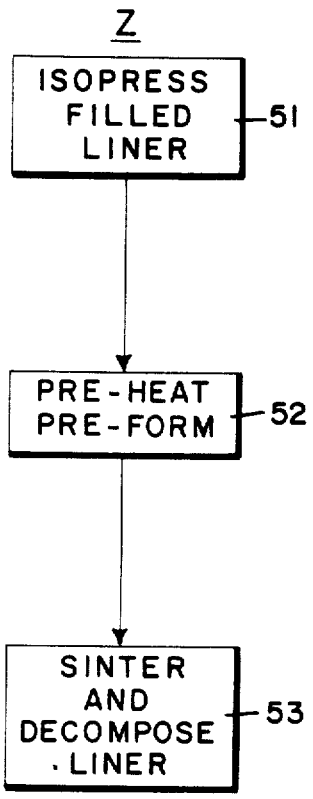
FIG. 9 shows the detailed steps of still another version of the present process.

As mentioned previously, the preferred method for removing the liner from the post-isopressed workpiece is technique C shown in FIG. 9. In this technique, after the workpiece and the liner has been isopressed in Step 51, they are moved to a preheating Step 52 which is normally necessary in sintering operations and then to the sintering furnace in Step 53. The material from which the liner is made is chosen to decompose without adverse effect in the preheating zone of the sintering furnace. Preferably, the decomposition would result in an innocuous gas, but, since most sintering furnaces are provided with suitable ventilating systems, the innocuousness of the products is not absolutely necessary. This technique is particularly applicable to use in conjection with technique A and B where the liner is intentionally made extremely thin and recycling of the liner material is not economic.

Figure 7:
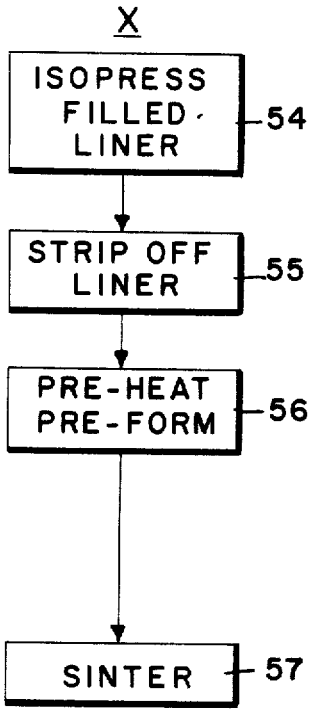
FIG. 7 shows the detailed steps of another version of the present process.

In an alternative liner removal technique X, shown in FIG. 7, after the isopressing Step 54, the liner is physically stripped off of the "green" workpiece in Step 55. The workpiece is then preheated in Step 56 and sintered in Step 57. This technique is particularly adapted for use with technique A.

Figure 8:
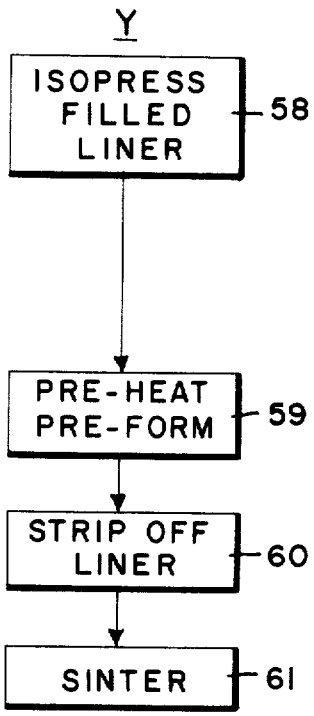
FIG. 8 shows the detailed steps of another version of the present process.

Technique Y, shown in FIG. 8, involves the same steps as technique X, except that the stripping operation occurs after the preform has been preheated. This allows a thicker and perhaps less flexible liner to be removed from the "green" workpiece without injuring the workpiece. Thus, the isopressing is accomplished in Step 58, the workpiece is preheated in Step 59 and then the liner is stripped off in Step 60. Then the workpiece is sintered in Step 61 in the normal manner. This procedure is particularly adapted for technique C where the liner is less flexible.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

[1. A process for forming a workpiece of a predetermined shape from powdered metal, comprising the steps of:

(a) forming a semi-rigid liner of heat-decomposible material having generally the said shape,
(b) adding a quantity of said powdered metal into the liner,
(c) providing the liner with a liquid-impervious sealing element which completely envelops it,
(d) isostatically compacting the sealing element, the liner and the contents,
(e) heating the liner and contents to cause decomposition of the liner and sintering the contents, and
(f) forging the contents, wherein the sealing element is a thin rubber bag in which the liner is enclosed, which bag is removed before the liner and contents are heated, and wherein the bag is a part of the isostatic press with an open end whose edges are clamped to the surface of the press cavity and open to the exterior for the introduction of the liner and contents and closed by a portion of the press before pressing.]

[2. A process for forming a workpiece of a predetermined shape from powdered metal, comprising the steps of:

(a) forming a semi-rigid liner of heat-decomposible material having generally the said shape,
(b) adding a quantity of said powdered metal into the liner,
(c) providing the liner with a liquid-impervious sealing element which completely envelops it,
(d) isostatically compacting the sealing element, the liner and the contents,
(e) heating the liner and contents to cause decomposition of the liner and sintering the contents, and
(f) forging the contents, wherein the liner is made of a foamed polymer in which the bubbles can collapse permanently during the compacting step.]

[3. A process for forming a workpiece of a predetermined shape from powdered metal, comprising the steps of:

(a) forming a semi-rigid liner of heat-decomposible material having generally the said shape, the liner being formed of a foamed polymer,
(b) adding a quantity of said powdered metal into the liner,
(c) providing the liner with a liquid-impervious sealing element which completely envelops it,
(d) isostatically compacting the sealing element, the liner and the contents,
(e) heating the liner and contents to cause decomposition of the liner and sintering the contents, and
(f) forging the contents, wherein the sealing element is a thin elastomer bag in which the liner is enclosed, which bag is removed before the liner and contents are heated.]

*4. A process for forming a workpiece of a predetermined shape from powdered metal, comprising the steps of:*

*(a) forming a semi-rigid liner of heat-decomposible material having generally the said shape,*
*(b) adding a quantity of said powdered metal into the liner,*
*(c) inserting the liner and contents into the open end of an elastomeric liquid-impervious bag which forms part of an isostatic press provided with means for sealing the open end of the bag,*
*(d) sealing the open end of the bag,*
*(e) isostatically compacting the bag against the liner so that the bag completely envelops the liner to compact the powdered metal in the liner,*
*(f) removing the liner and contents from the bag,*
*(g) heating the liner and contents to cause decomposition of the liner and sintering the contents to form a rough workpiece, and*
*(h) forging the rough workpiece.*

*5. A process for forming a workpiece of a predetermined shape from powdered metal, comprising the steps of:*

*(a) forming a semi-rigid liner of heat-decomposible foamed polymer having generally the said shape,*
*(b) adding a quantity of said powdered metal into the liner,*

(c) *inserting the liner and contents into an elastomeric liquid-impervious sealing element,*

(d) *isostatically compacting the bag against the liner so that the sealing element completely envelops the liner to compact the powdered metal in the liner,*

(e) *removing the liner and contents from the sealing element,*

(f) *heating the liner and contents to cause decomposition of the liner and sintering the contents to form a rough workpiece, and*

(g) *forging the rough workpiece.*

*6. A process for forming a workpiece of a predetermined shape from powdered metal, comprising the steps of:*

(a) *forming a semi-rigid liner of heat-decomposible foamed polymer having generally the said shape,*

(b) *adding a quantity of said powdered metal into the liner,*

(c) *inserting the liner and contents into an elastomeric liquid-impervious bag,*

(d) *isostatically compacting the bag against the liner so that the bag completely envelops the liner to compact the powdered metal in the liner,*

(e) *removing the liner and contents from the bag,*

(f) *heating the liner and contents to cause decomposition of the liner and sintering the contents to form a rough workpiece, and*

(g) *forging the rough workpiece.*

*7. A process for forming a workpiece of a predetermined shape from powdered sinterable material for mechanical finishing, comprising the steps of:*

(a) *forming a semi-rigid liner of heat-decomposible material having generally the said shape,*

(b) *adding a quantity of said powdered material into the liner,*

(c) *inserting the liner and contents into the open end of an elastomeric liquid-impervious bag which forms part of an isostatic press provided with means for sealing the open end of the bag,*

(d) *pressurizing the press to force the bag against the liner so that the bag completely envelops the liner to compact the powdered material in the liner,*

(e) *removing the liner and contents from the bag, and*

(f) *heating the liner and contents to cause decomposition of the liner and sintering the contents to form a rough workpiece.*

*8. A process for forming a rough workpiece of a predetermined shape from powdered sinterable material for mechanical finishing, comprising the steps of:*

(a) *forming a semi-rigid liner of heat-decomposible foamed polymer having generally the said shape,*

(b) *adding a quantity of said powdered material into the liner,*

(c) *inserting the liner into an elastomeric liquid-impervious sealing element,*

(d) *isostatically pressurizing the sealing element and the contents so as to force the sealing element against the liner so that the sealing element completely envelops the liner to permanently collapse the bubbles of the foamed polymer and to compact the powdered material in the liner,*

(e) *removing the liner and contents from the sealing element, and*

(f) *heating the liner and contents to cause decomposition of the liner and sintering the contents to form a rough workpiece.*

*9. A process for forming a rough workpiece of a predetermined shape from powdered sinterable material for mechanically finishing, comprising the steps of:*

(a) *forming a semi-rigid liner of heat-decomposible foamed polymer having generally the said shape,*

(b) *adding a quantity of said powdered material into the liner,*

(c) *enclosing the liner within a liquid-impervious elastomer bag,*

(d) *isostatically pressurizing the bag so that the bag completely envelops the liner and contents to force the bag against the liner and to compact the powdered material in the liner,*

(e) *removing the bag and heating the liner and contents to cause decomposition of the liner and sintering the contents to form a rough workpiece.*

* * * * *